United States Patent
Aihara

(10) Patent No.: US 8,643,900 B2
(45) Date of Patent: Feb. 4, 2014

(54) IMAGE FORMING APPARATUS AND COMPUTER-READABLE STORAGE MEDIUM FOR COMPUTER PROGRAM

(75) Inventor: Nobuhiro Aihara, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 134 days.

(21) Appl. No.: 13/423,895

(22) Filed: Mar. 19, 2012

(65) Prior Publication Data

US 2012/0243010 A1    Sep. 27, 2012

(30) Foreign Application Priority Data

Mar. 23, 2011    (JP) .................................. 2011-063472

(51) Int. Cl.
  *H04N 1/60*    (2006.01)
  *G06K 15/02*    (2006.01)
  *G06F 3/12*    (2006.01)

(52) U.S. Cl.
  USPC .......... 358/1.9; 358/1.14; 358/1.15; 358/1.13

(58) Field of Classification Search
  USPC .......... 358/1.9, 1.15, 1.13; 726/1, 2; 709/223, 709/225
  See application file for complete search history.

(56) References Cited

U.S. PATENT DOCUMENTS

| | | | |
|---|---|---|---|
| 7,367,044 B2 * | 4/2008 | Fowler et al. ...................... 726/1 |
| 7,908,642 B2 * | 3/2011 | Rubio et al. ....................... 726/2 |
| 7,984,481 B2 * | 7/2011 | Takahashi et al. ................. 726/2 |
| 8,151,362 B2 | 4/2012 | Miyamoto | |
| 8,310,697 B2 * | 11/2012 | Kitamura et al. ............. 358/1.15 |
| 8,441,659 B2 | 5/2013 | Homma | |
| 2007/0174455 A1 * | 7/2007 | Sugimoto ...................... 709/225 |
| 2007/0282995 A1 * | 12/2007 | Mizuno et al. ................ 709/223 |
| 2010/0147945 A1 | 6/2010 | Bando et al. | |

FOREIGN PATENT DOCUMENTS

| | | |
|---|---|---|
| JP | 2008-003810 A | 1/2008 |
| JP | 2009-012393 A | 1/2009 |
| JP | 2010-140367 A | 6/2010 |
| JP | 2010-218089 A | 9/2010 |
| JP | 2010-218381 A | 9/2010 |

OTHER PUBLICATIONS

Japanese Office Action (Notification of Reason(s) for Refusal) dated May 21, 2013, issued by the Japan Patent Office in corresponding Japanese Patent Application No. 2011-063472, and a English Translation of the Japanese Office Action.

* cited by examiner

*Primary Examiner* — Charlotte M Baker
(74) *Attorney, Agent, or Firm* — Buchanan Ingersoll & Rooney PC

(57) ABSTRACT

An image forming apparatus is provided which performs a process on data stored in advance in accordance with operation by a verified user. The apparatus includes a user authentication portion for performing user authentication on a second user in a state where a first user is verified and logs in the image forming apparatus, an access control portion for, in a login state where both the first user and the second user are verified, giving a permission to perform a process on user data to which one of the first user and the second user determined based on a login order is granted access, and an operation control portion for, in the login state, accepting operation that relates to the user data and falls within at least one of an operation permission given in advance to the first user and an operation permission given in advance to the second user.

8 Claims, 8 Drawing Sheets

FIG. 3
(A)
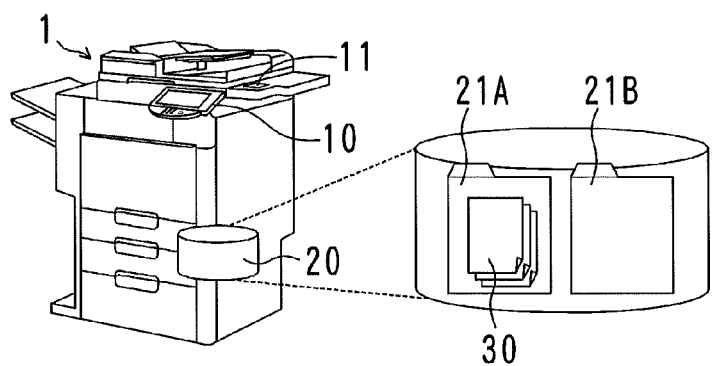
(B)
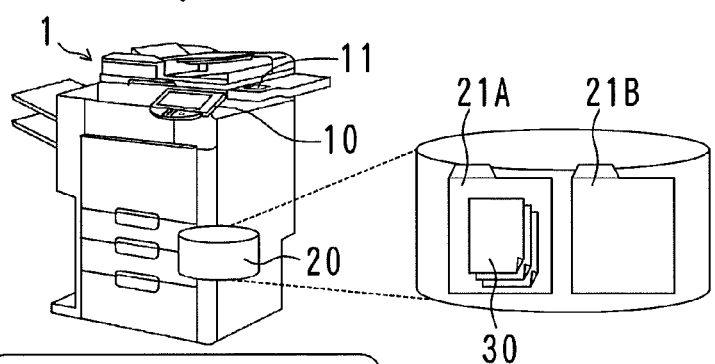
EXTEND RIGHT OF USER A
(C)
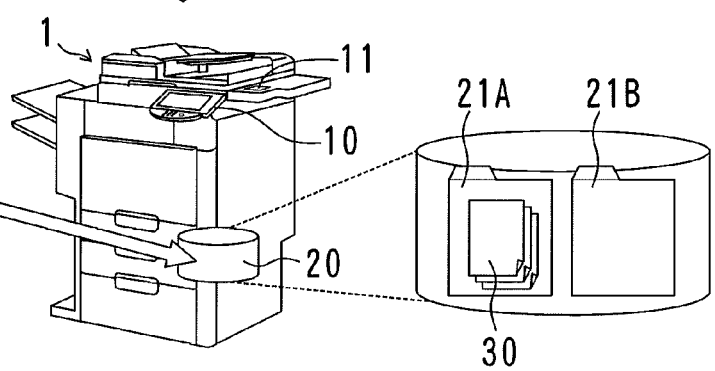
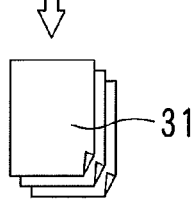

| USER | OPERATION PERMISSION | | | |
|---|---|---|---|---|
| | FUNCTION SELECTION | | | |
| | PRINTING | COPYING | SCANNING | FAX |
| A | NG | OK | OK | OK |
| B | OK | OK | OK | OK |
| C | NG | OK | NG | NG |
| ⋮ | ⋮ | ⋮ | ⋮ | ⋮ |

243

| USER | OPERATION PERMISSION | | | | | |
|---|---|---|---|---|---|---|
| | PRINT COLOR SELECTION | | | NUMBER OF (REMAINING) PRINTABLE PAGES | | |
| | FULL-COLOR | TWO-COLOR | MONOCHROME | FULL-COLOR | TWO-COLOR | MONOCHROME |
| A | NG | OK | OK | 0 | 30 | 150 |
| B | OK | OK | OK | 50 | 50 | 200 |
| C | NG | NG | OK | 0 | 0 | 100 |
| ⋮ | ⋮ | ⋮ | ⋮ | ⋮ | ⋮ | ⋮ |

252

| USER | OPERATION PERMISSION | | | |
|---|---|---|---|---|
| | FUNCTION SELECTION | | | |
| | PRINTING | COPYING | SCANNING | FAX |
| A | OK | OK | OK | OK |

253

| USER | OPERATION PERMISSION | | | | | |
|---|---|---|---|---|---|---|
| | PRINT COLOR | | | NUMBER OF (REMAINING) PRINTABLE PAGES | | |
| | FULL-COLOR | TWO-COLOR | MONOCHROME | FULL-COLOR | TWO-COLOR | MONOCHROME |
| A | OK | OK | OK | 50 | 50 | 200 |

IMAGE FORMING APPARATUS AND COMPUTER-READABLE STORAGE MEDIUM FOR COMPUTER PROGRAM

This application is based on Japanese patent application No. 2011-063472 filed on Mar. 23, 2011, the contents of which are hereby incorporated by reference.

BACKGROUND OF THE INVENTION

1. Field of the Invention

The present invention relates to an image forming apparatus operated by a user who has been successfully authenticated, and a computer program executed in such an image forming apparatus. The image forming apparatus is, for example, a printer, a copier, and a Multi-functional peripheral (MFP).

2. Description of the Related Art

An information device called an MFP is used for copying and network printing both of which are uses of an image forming apparatus, and is also used to input, store, and transfer a document. The MFP has a box functioning as a data folder in which documents are stored, and is capable of saving a document inputted by scanning a document sheet or by communicating with an external device. The MFP also serves to, in response to operation by a user, print a document stored in a box; attach the document to an e-mail message for transmission; convert the document into facsimile data for transmission; and transfer the document to an external device.

A case is described in which an MFP is installed in an office of business and is shared by a plurality of users. In such a case, the MFP performs user authentication on each user before he/she uses the MFP. The authentication method may be: a method of reading out an identification code from an IC card or another medium; a method of reading biometric information from a user; or a method for a user to use a keypad to enter authentication information such as an identification code or a password. In any event, the MFP verifies authentication information entered by a user before the use thereof against authentication information registered in advance, or, alternatively, asks an authentication server to perform the verification. If the verification result is positive, then the user is successfully authenticated, and the MFP becomes a login state in which operation by the user is accepted.

For shared use of the MFP by users, the MFP is so configured that operation permissions are settable on a user-by-user basis. For example, a setting is possible in which only a specific user is authorized to designate "full-color" as a color for print. Another setting is possible in which an upper limit of cumulative print quantity is determined depending on user's department. In general, an administrator of the MFP makes the settings for operation permissions and registers the authentication information as described above.

There has traditionally been a technology for temporarily setting MFP operation permissions for an unregistered user. An image forming apparatus, described in Japanese Laid-open Patent Publication No. 2008-003810, is configured to enable proxy registration in which any user already registered (a parent user) substitutes as an administrator to register an unregistered user (a child user). In the proxy registration mode, the image forming apparatus requests both the unregistered user and the parent user to enter their individual authentication information (user ID and password). After the parent user is successfully authenticated, the image forming apparatus accepts operation to set a right for the child user in a manner not to exceed the right granted to the parent user. Further, there is proposed a method for registering an unregistered user as a temporary user (Japanese Laid-open Patent Publication No. 2010-140367). According to the method, a registration card is prepared, and data is concurrently or successively read out from a user card of an unregistered user (e.g., visiting employee user) and the registration card, so that the unregistered user is registered as a temporary user. The temporary user is given a right indicated in data of the registration card.

A case is assumed in which a user of an image forming apparatus would like to temporarily perform operation beyond his/her operation permission. Such a case is, for example, a case where a user A authorized to designate "monochrome" only as a color for print wishes to print a document in his/her own box A in full color.

However, in order that a user causes an MFP to perform a desired process on a document in a box, e.g., to print the document, and to send the document through e-mail, it is necessary for the user to be given both an access right to designate the document as processing target data and an operation permission for the desired process. If at least any one of the right and the permission is not given to the user, the image forming apparatus does not accept the operation that does not fall within his/her right. In light of this, the user A, thus, is not able to cause the image forming apparatus to perform desired full color printing.

In order that the user A obtains a desired printed matter, it may be conceived to request a user B who is authorized to perform full color printing to perform operation in place of the user A. The detailed procedures are as follows.

(1) The user A operates a personal computer A, used by him/her, to access a box A, and moves a document in the box A to a removable storage medium such as a USB memory. (2) The user A hands the removable storage medium to the user B. (3) The user B operates a personal computer B, used by him/her, to access his/her own box B, and moves the document from the removable storage medium to the box B. (4) The user B causes the MFP to print the document in the box B in full color.

The procedures (1) through (4) enable the user A to obtain a desired printed matter without using a shared box to which another user possibly makes access before the users A and B know it, i.e., without reducing the information security. However, the user A and the user B have to do a troublesome work of, for example, shuttling data therebetween through the removable storage medium.

Even if the conventional technology discussed above is used, in order for the user A to perform operation beyond his/her right, the user B or the user A has to do the troublesome work. In the proxy registration described in Japanese Laid-open Patent Publication No. 2008-003810, prior to operation by the user A, the user B needs to complete registration for extending the right of the user A. In the registration through a registration card described in Japanese Laid-open Patent Publication No. 2010-140367, the user A needs to borrow a registration card from an administrator. The user A cannot ask every user who has a right desired by the user A. Also, the administrator has to create a variety of registration cards depending on rights to be extended, and to manage the registration cards, which places a large load on the administrator.

SUMMARY

The present disclosure is directed to solve the problems pointed out above, and therefore, an object of an embodiment of the present invention is to provide an apparatus configured to temporarily extend a user operation permission with simple operation.

An image forming apparatus according to embodiments of the present invention is an image forming apparatus for performing a process on data stored in advance in accordance with operation by a verified user. The image forming apparatus includes a user authentication portion configured to perform user authentication on a second user in a state where a first user is verified and logs in the image forming apparatus, an access control portion configured to, in a login state where both the first user and the second user are verified, give a permission to perform a process on user data to which one of the first user and the second user determined based on a login order is granted access, and an operation control portion configured to, in the login state, accept operation that relates to the user data and falls within at least one of an operation permission given in advance to the first user and an operation permission given in advance to the second user.

These and other characteristics and objects of the present invention will become more apparent by the following descriptions of preferred embodiments with reference to drawings.

BRIEF DESCRIPTION OF THE DRAWINGS

FIG. 3 shows an example of operation steps for a case where users use a multiple login function to output a document.

FIG. 6 is a diagram showing an example of a case where an operation permission is temporarily modified.

DESCRIPTION OF THE PREFERRED EMBODIMENTS

Descriptions are provided below by taking an MFP as an example of an image forming apparatus which works in response to operation by a user who has been successfully authenticated.

Figure 1:
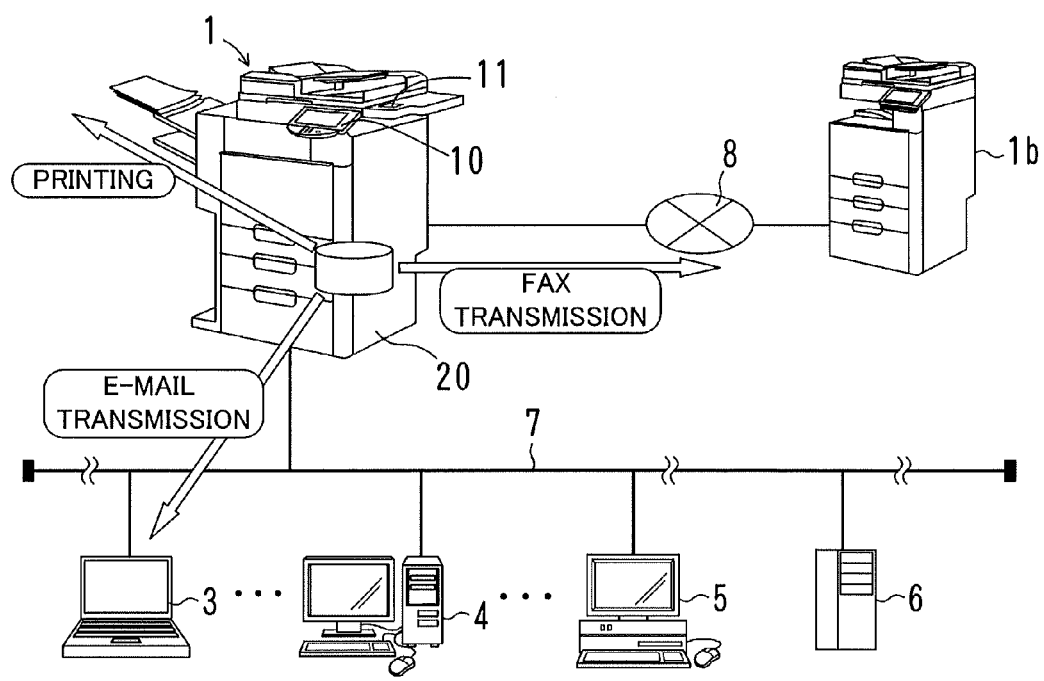
FIG. 1 is a diagram showing an example of major applications of an MFP according to an embodiment of the present invention.

The MFP 1 exemplified in FIG. 1 is connected to a Local Area Network (LAN) 7 constructed in, for example, an office of business. The MFP 1 is capable of performing communication with external devices such as a plurality of personal computers (hereinafter, each of which is referred to as a "PC") 3, 4, and 5, and a server 6. The MFP 1 is also capable of performing facsimile communication with another MFP 1b or a non-illustrated communication device via a telephone line network 8. The MFP 1 works in accordance with access from an external device or operation through an operating panel 10 provided in the upper front of a casing of the MFP 1.

The MFP 1 contains therein a storage 20 that is used to store document data and to save the same temporarily. The storage 20 stores, therein, document data obtained by scanning a document sheet with an image scanner of the MFP 1, and document data sent from the PCs 3-5. A user of the MFP 1 performs operation through the operating panel 10 to cause the MFP 1 to perform a variety of processes such as printing based on document data stored in the storage 20, e-mail massage transmission of the document data, and facsimile transmission of the document data.

A user who intends to cause the MFP 1 to perform a desired process is required to be successfully authenticated. Referring to FIG. 1, the MFP 1 is provided with a card reader, as an authentication device 11, adjacent to the operating panel 10. The card reader is operable to read out information from an IC card in a non-contact manner. Each user sharing the MFP 1 is given in advance, as a user card, an IC card on which his/her identification information is stored. Each user brings his/her own user card close to the authentication device 11, and thereby user authentication is performed on the user.

The user card is not limited to such an IC card, and may be a magnetic card or an optical card. The combined use is possible of authentication through user card and authentication through manual entry of authentication information such as a password. Alternatively, it is also possible to select any one from the two types of authentication. Instead, it is possible to make only the authentication through manual entry available. Yet alternatively, the authentication device 11 may be a sensor for reading out biometric information such as a fingerprint or a vein pattern from a user. In short, any authentication method may be used.

As for user authentication, the MFP 1 has a feature called "multiple login". The multiple login function enables the following: In a login state where the MFP 1 verifies one user and operation by the user is accepted, the MFP 1 performs an authentication process on another user. Stated differently, according to the multiple login, the MFP 1 performs user authentication not only when the MFP 1 is in a logout state. Even when a user is logging in the MFP 1, i.e., a login user is present therein, the MFP 1 performs user authentication on another user. In this embodiment, since the number "n" of login users is not limited, even after first and second users have logged in the MFP 1, third, fourth, . . . , n-th users are allowed to log in the MFP 1 in sequence.

Figure 2:
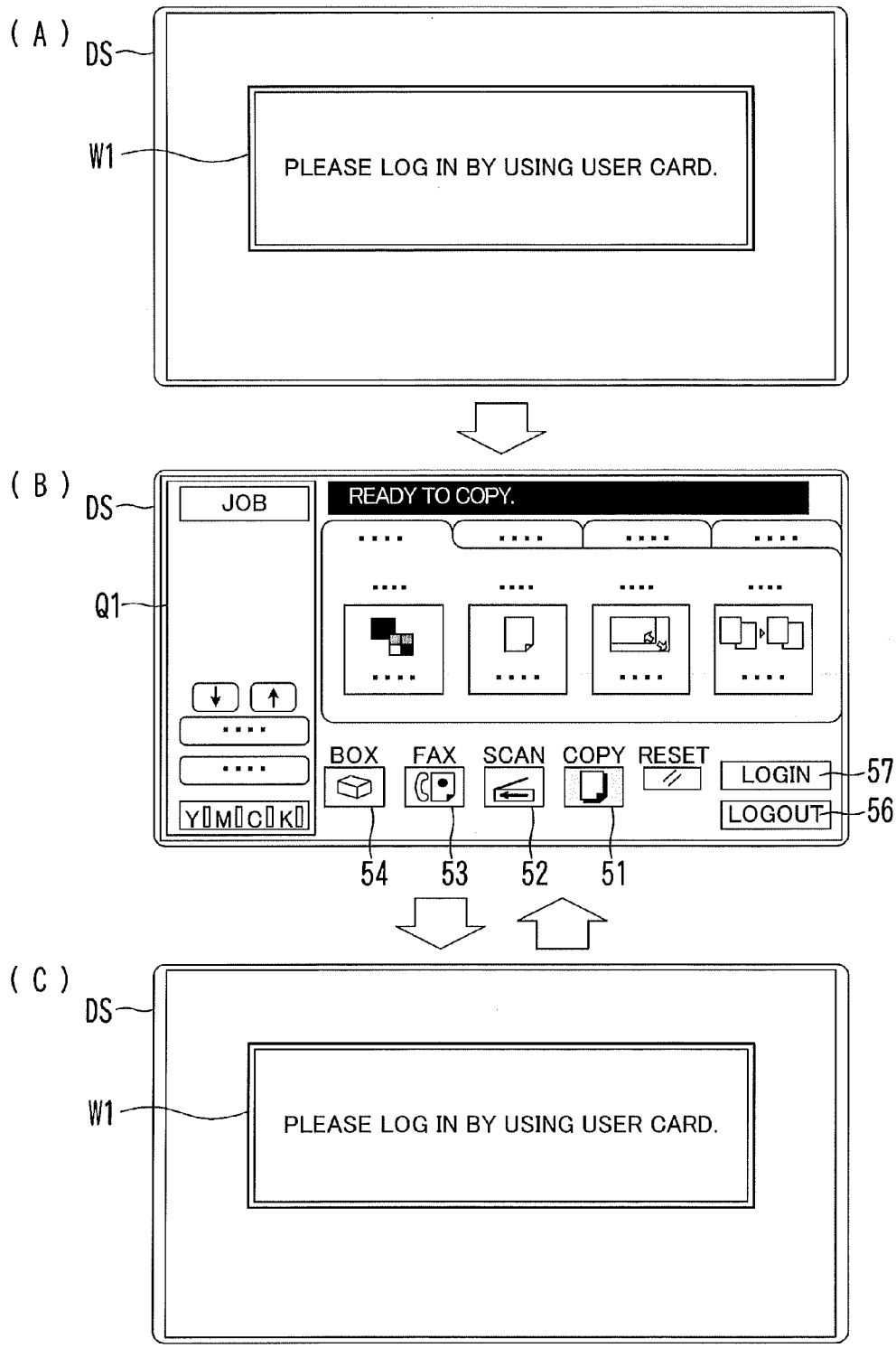
FIG. 2 shows an example of displays provided on a screen for multiple login.

FIG. 2 shows an example of displays provided on a screen for multiple login.

(A) of FIG. 2 shows a logout state in which user operation through the operating panel 10 is not accepted. In this state, a window W1 for prompting a user to log in the MFP 1 through a user card is displayed on a screen DS of a display of the operating panel 10. The screen DS also functions as a touch-sensitive panel detecting that an operation button on the screen is pressed by a user.

A user who intends to use the MFP 1 causes the MFP 1 to read out his/her own user card information. When the MFP 1 verifies the user, a copy basic settings screen Q1 is displayed on the screen DS as shown in (B) of FIG. 2. The copy basic settings screen Q1 is an operating screen for copy function that is used highly frequently as compared to other functions of the MFP 1. In addition to operation buttons for copy settings, the copy basic settings screen Q1 contains, therein, selection buttons 51, 52, 53, and 54 for copying and other functions, a logout button 56 and a login button 57 both of which are related to user authentication.

The logout button 56 is an operation button used for a login user to intentionally log out of the MFP 1. The logout button 56 is pressed by the login user when he/she leaves the install location of the MFP 1. The logout button 56 is provided in order to prevent a so-called spoofing user from using the MFP 1 fraudulently during a login state keep period from when the MFP 1 detects no operation over a predetermined period of time to when the MFP 1 is automatically turned into a logout state.

On the other hand, the login button 57 is an operation button for the multiple login function that enables acceptance of additional login operation in the login state. When a login user or an auxiliary user who cooperates with the login user (such an auxiliary user is hereinafter referred to as a support user) presses the login button 57, the window W1 is displayed again as shown in (c) of FIG. 2 with the login state maintained. Subsequently, the support user causes the MFP 1 to read out his/her own user card information. When the MFP 1 verifies the support user, the indication on the screen is changed from the window W1 to the display provided immediately before the window W1 is displayed, i.e., the copy basic settings screen Q1 shown in (B) of FIG. 2. Thereafter, the operation for pressing the login button 57 and for causing the MFP 1 to read out user card information is performed repeatedly. As a result, three or more users including two or more support users are accepted as login users.

FIG. 3 shows an example of operation steps for a case where users use the multiple login function to output a document. The example of FIG. 3 assumes the following case. A user A intends to print a document 30 stored in the storage 20 in full color. The document 30 is stored as user data in a personal box (data folder) 21A assigned to the user A. The user A is authorized to access the document 30. The user A, however, is not given an operation permission to cause the MFP 1 to perform full color printing. To cope with this, the user A asks a user B who is given the operation permission to cause the MFP 1 to perform full color printing to be a support user for the user A.

As shown in (A) of FIG. 3, the user A, who intends to use the MFP 1, first logs thereonto. This is because which document can be designated as a process target depends on the login order. In this embodiment, a document that is accessible by a user who first logs onto the MFP 1 based on his/her access right can be a process target.

After the user A logs in the MFP 1, the user B logs thereonto as shown in (B) of FIG. 3. What the user B, who is a support user for the user A, should do is to be successfully authenticated by the MFP 1. Since user authentication is performed by using a card in this example, all the user B has to do is to cause the MFP 1 to read out his/her own user card information without any other operation. In response to the login of the user B, the MFP 1 extends the operation permission of the user A in a manner to fall within the operation permission granted to the user B. This enables the user A to obtain an operation permission to designate full color printing. Note, however, that the extended operation permission is a temporary permission which is effective only for a limited period, i.e., until the user A logs out of the MFP 1.

The user A whose operation permission is extended as described above operates the operating panel 10 to select the document 30 in the storage 20 as a print target as shown in (C) of FIG. 3, and causes the MFP 1 to print the document 30 in full color. To be specific, the user A presses the selection button 54 on the copy basic settings screen Q1 to select the box function, selects the document 30 in the box 21A, and causes the MFP 1 to perform full color printing.

The user A can obtain a desired full-color printed matter 31 through the foregoing simple operation. Unlike a conventional image forming apparatus having no multiple login function, the MFP 1 eliminates the need for the user A to move, in advance, a document 30 to be printed from the box 21A to a predetermined recording medium, and to pass the recording medium to the user B. With the MFP 1, it is unnecessary for the user B to move the document 30 from the received recording medium to his/her box 21B. It is also unnecessary for the user B to perform operation, in place of the user A, for print execution of the document 30. As discussed above, all the user B has to do is only to be verified by the MFP 1.

Figure 4:
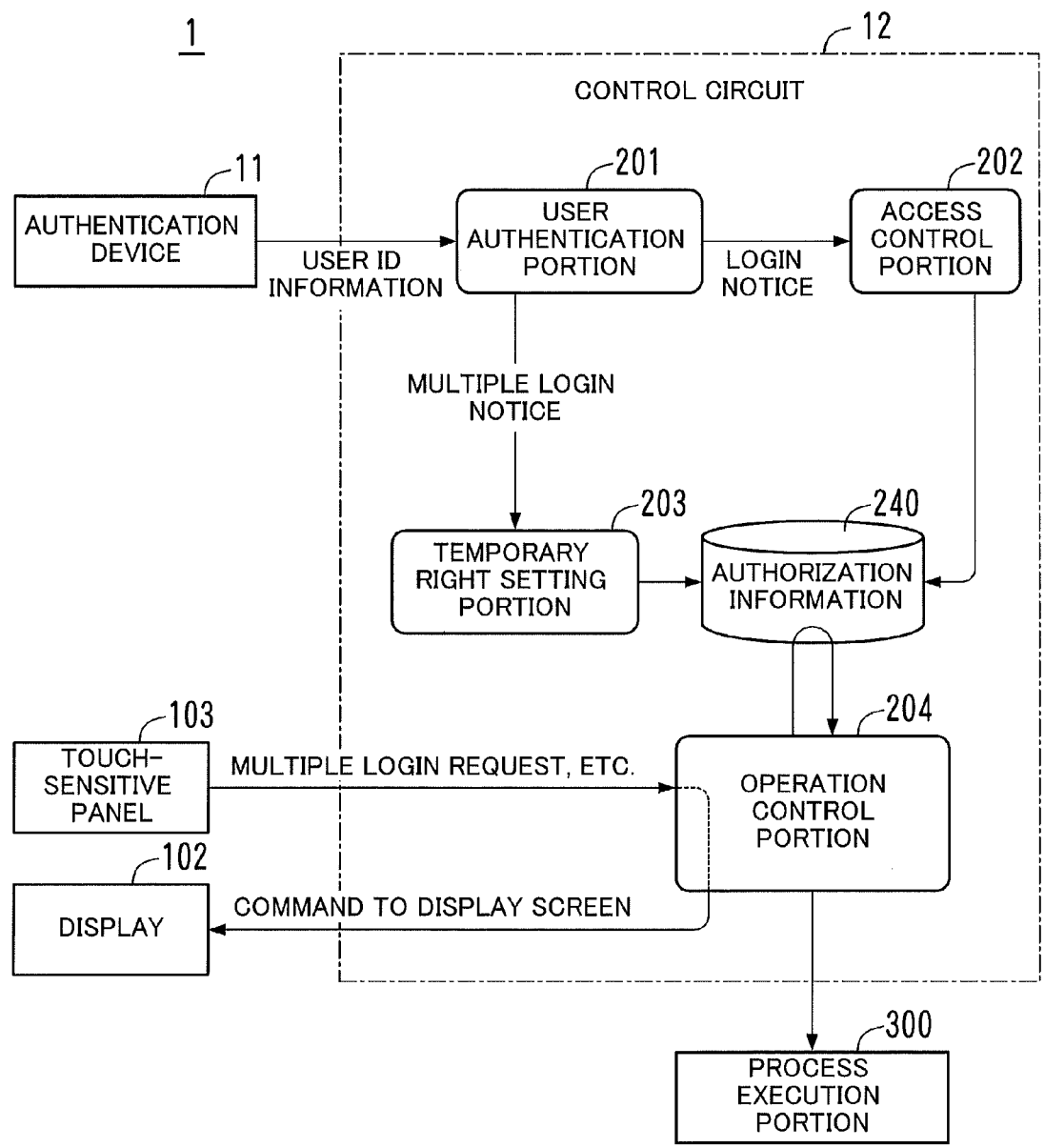
FIG. 4 is a diagram showing an example of the configuration of a multiple login-related function of an MFP.

FIG. 4 is a diagram showing an example of the configuration of the multiple login-related function of the MFP 1. The MFP 1 is configured of functional elements such as a user authentication portion 201, an access control portion 202, a temporary right setting portion 203, and an operation control portion 204. These portions are functional elements implemented when a central processing unit (CPU) of a control circuit 12 which serves to control the MFP 1 executes a predetermined computer program. For the program execution, authorization information 240 is loaded from the storage 20 onto a work area. The authorization information 240 indicates access rights and operation permissions of registered users.

Upon receipt of user identification information from the authentication device 11, the user authentication portion 201 performs user authentication on a user who intends to log in the MFP 1. When verifying a first user who intends to log in the MFP 1 that is in the logout state, the user authentication portion 201 conveys the fact to the access control portion 202. When verifying a second user who intends to log in the MFP 1 that is in a state where the first user logs in, the user authentication portion 201 conveys the fact to the temporary right setting portion 203. In the multiple login state where the first and second users log in the MFP 1, every time when verifying a third user and beyond, the user authentication portion 201 conveys the fact to the temporary right setting portion 203.

Once receiving the login notification from the user authentication portion 201, the access control portion 202 sets a permission to access data stored in the storage 20. To be specific, the access control portion 202 refers to access right information of the authorization information 240. The access control portion 202, then, fixes an access right granted to the first user who has first logged onto the MFP 1 at an active access right that is effective in operation for designating process target data. The fixing makes it impossible to, in the multiple login state thereafter, designate, as a process target of printing and transmission, data for which the first user is not given an access right even if any user other than the first user is given a right to access the data.

The temporary right setting portion 203 serves to set an active operation permission that is effective in operation performed in the multiple login state. To be specific, the temporary right setting portion 203 fixes, at the active operation permission, a permission called a logical OR of operation permissions granted in advance to two or more login users including the first and second users. In other words, the temporary right setting portion 203 fixes, for each operation item, the broadest permission among permissions given to the login users at the active operation permission. For example, if the second user or another login user is granted a permission broader than that of the first user, the permission given to the first user is extended. Descriptions are given later as to how to set an operation permission.

The operation control portion 204 serves to control displays produced on a display 102 of the operating panel 10. The operation control portion 204 also serves to issue an execution command depending on operation to a process execution portion 300. The process execution portion 300 is a generic name of elements for performing a variety of processes such as printing or transmission. The operation control portion 204 receives the details of operation performed by a user from a touch-sensitive panel 103 of the operating panel 10. The press of the login button 97 is conveyed to the operation control portion 204 as a multiple login request. As for selection of process target data, the operation control portion 204 enables only designation permitted based on an active access right set by the access control portion 202. As for process selection and operation setting of each process, the operation control portion 204 enables only operation falling within the active operation permission set by the temporary right setting portion 203.

Figure 5:
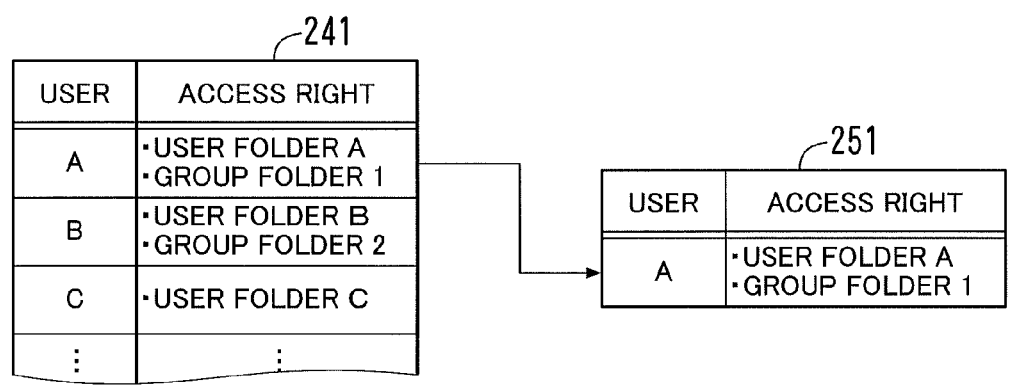
FIG. 5 is a diagram showing an example of access right settings.

FIG. 5 is a diagram showing an example of access right settings. An access right table 241, which is a part of the authorization information 240, shows access rights granted to registered users on a user-by-user basis. The access right is identified by a data folder to which the corresponding user is allowed to make access. In the illustrated example, the user A is associated with a user folder A (box A) and a group folder 1. This means that the user A is authorized to access data stored in the user folder A or in the group folder 1.

When a user logs onto the MFP 1 that is in the logout state, an access right, given to the user, shown in the access right table 241 is copied to an active table 251 as an active access right. The exemplified active access right is an access right given to the user A. The active table 251 is refereed to by the operation control portion 204 and is used to determine whether or not process target data is selected properly.

FIG. 6 is a diagram showing an example of a temporary change in operation permission. Operation permission tables 242 and 243, which are a part of the authorization information 240, show operation permissions of registered users on a user-by-user basis.

The operation permission table 242 shows, for each user, the presence/absence of rights to select four functions of printing, copying, scanning, and facsimile. In the illustrated example, the user A is granted a right to select any of three functions except the printing function, and the user B is granted a right to select any of the four functions.

The operation permission table 243 shows, with respect to three modes of print color, i.e., full-color mode, two-color mode, and monochrome mode, the presence/absence of rights to select the modes, and the number of remaining printable pages in each of the modes. Referring to the operation permission table 243, the user A is authorized to select any of the two modes except the full-color mode. The user A is authorized to designate, as the number of remaining printable pages, up to "30" in the two-color mode and up to "150" in the monochrome mode. The user B is authorized to select any of the three modes including the full-color mode. The user B is authorized to designate, as the number of remaining printable pages, up to "50" in the full-color mode, up to "50" in the two-color mode, and up to "200" in the monochrome mode.

When a user logs onto the MFP 1 that is in the logout state, an operation permission, given to the user, shown in the operation permission tables 242 and 243 is copied to active tables 252 and 253 as an active operation permission. Unless another user logs onto the MFP 1 thereafter, the active tables 252 and 253 in which the information of the operation permission tables 242 and 243 is copied are referred to by the operation control portion 204, and are used to select a process and to determine whether or not operation for action settings is performed properly.

On the other hand, when another user logs onto the MFP 1 that is in the login state, the active tables 252 and 253 are updated. In such a case, the active operation permission is deemed as a logical OR of operation permissions granted to the plurality of login users as described earlier. FIG. 6 shows an example of the contents of the active tables 252 and 253 for a case where the MFP 1 is in the multiple login state where the user A logs onto the MFP 1 and then the user B logs thereonto.

Referring to the active table 252, the user A is given a permission to select any of the four functions of printing, copying, scanning, and facsimile. The permission corresponds to the permission granted to the user B. As is clear from the comparison between the operation permission table 242 and the active table 252, when attention is focused on the user A who has first logged onto the MFP 1, a permission given to the user A is extended from "printing disapproved (NG)" to "printing approved (OK)".

Referring to the active table 253, the user A is given a permission to select any of the three modes of full-color mode, two-color mode, and monochrome mode. Further, the user A is also given a permission to designate, as the number of remaining printable pages, up to "50" in the full-color mode, up to "50" in the two-color mode, and up to "200" in the monochrome mode. The permission corresponds to the permission granted to the user B. When attention is focused again on the user A, a permission for the full-color mode is extended from "disapproved (NG)" to "approved (OK)", a permission for the number of remaining printable pages in the full-color mode is extended from "zero" to "50", a permission for the number of remaining printable pages in the two-color mode is extended from "30" to "50", and a permission for the number of remaining printable pages in the monochrome mode is extended from "150" to "200".

Figure 7:
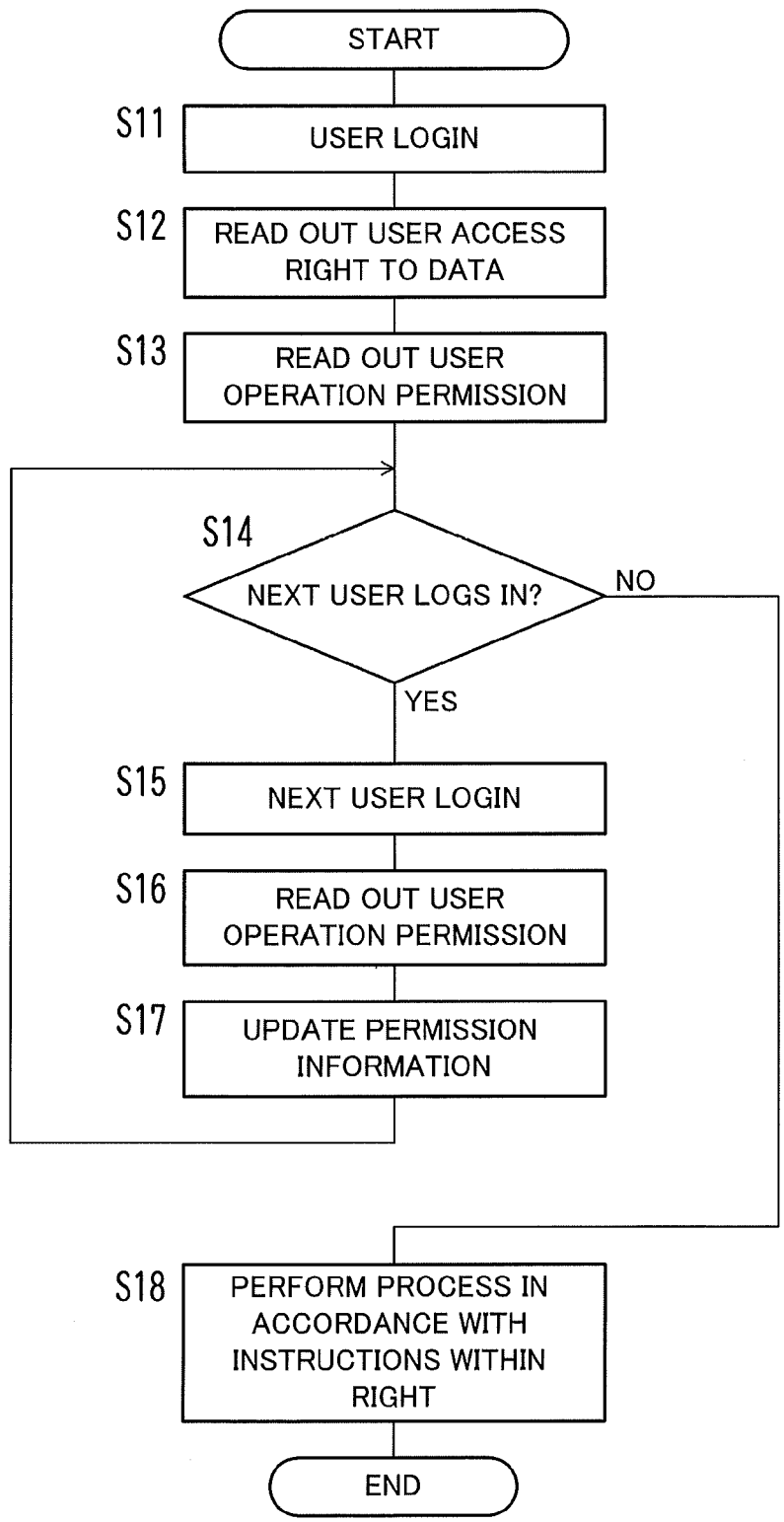
FIG. 7 is a flowchart depicting an example of the flow of multiple login-related processing performed by an MFP.

FIG. 7 is a flowchart depicting an example of the flow of multiple login-related processing performed by the MFP 1.

When the MFP 1 in the logout state verifies a user who intends to log thereonto (Step S11), the MFP 1 obtains an access right and an operation permission given to the user from the access right table 241 and the operation permission tables 242 and 243, and sets the access right and the operation permission in the active tables 252 and 253 (Step S12 and S13). If there is no login operation by another user (No in Step S14), the MFP 1 accepts operation falling within the right/permission set in the active tables 252 and 253, and performs a process designated through the operation (Step S18).

On the other hand, if one or more users already log in the MFP 1, and another user presses the login button 57 to make a request for login (Yes in Step S14), the MFP 1 verifies the user (Step S15). Then, the MFP 1 obtains an access right and an operation permission given to the verified user from the access right table 241 and the operation permission tables 242 and 243 (Step S16), and updates the active tables 252 and 253 accordingly (Step S17).

Figure 8:
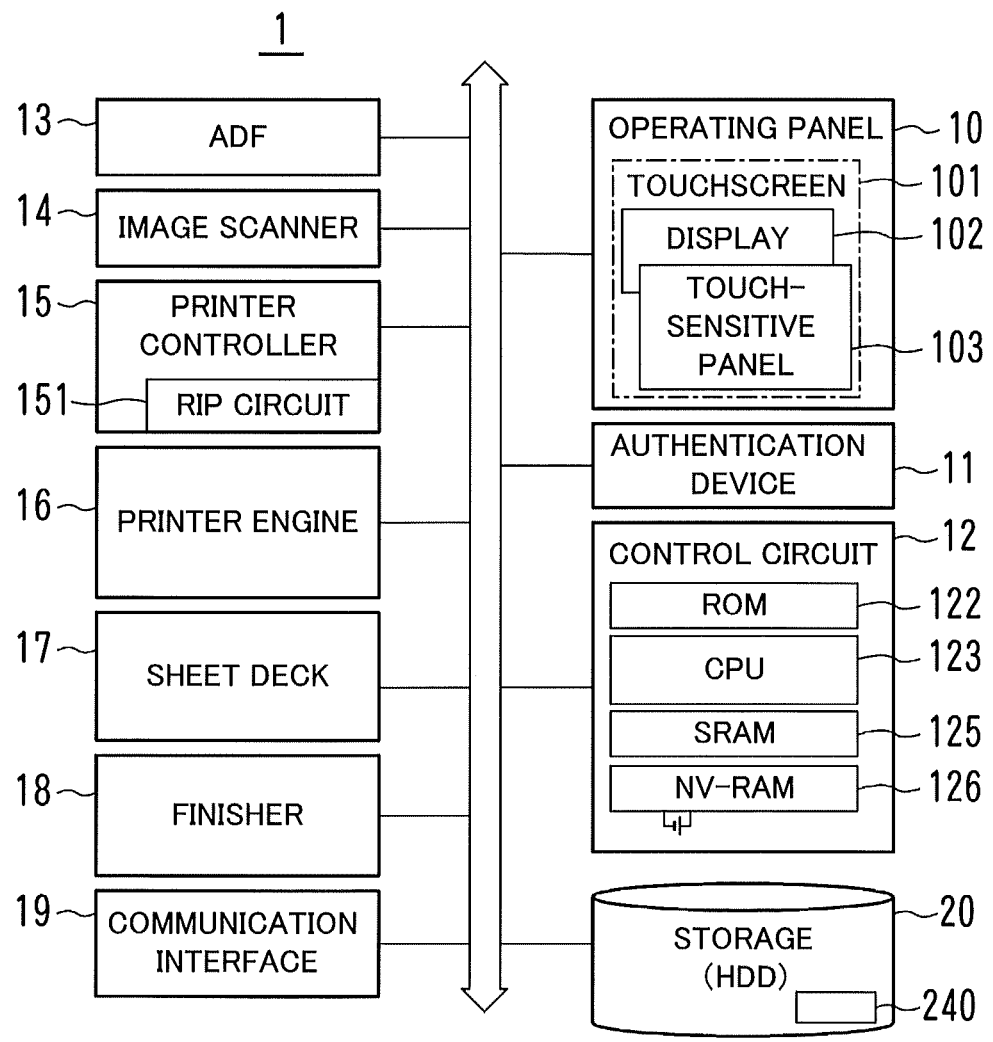
FIG. 8 is a block diagram showing an example of the hardware configuration of an MFP.

FIG. 8 is a block diagram showing an example of the hardware configuration of the MFP 1. The MFP 1 is provided with the operating panel 10 having a touchscreen 101. The touchscreen 101 includes the display 102 for displaying operating screens and document data, and the translucent touch-sensitive panel 103 provided to make close contact with a screen of the display 102. The front face of the touchscreen 101 serves as a screen and also as a touch operation surface. The operating panel 10 has fixed-keys including non-illustrated numerical keys, in addition to the touchscreen 101.

The authentication device 11 serves to read out identification data from a user card owned by a user who is to log onto the MFP 1. As described earlier, any authentication method may be used, and a device compatible with the authentication method to be used is deemed as the authentication device 11. The authentication device 11 may be, for example, a sensor for reading out biometric information of a user, or a keyboard through which authentication information is manually entered.

The MFP 1 has the control circuit 12 for controlling an overall operation of the MFP 1. The control circuit 12 is configured of a Read Only Memory (ROM) 122 for memorizing a control program, a Central Processing Unit (CPU) 123 for executing the control program and a variety of applications, a Static Random Access Memory (SRAM) 125 used as a work area for program execution, a battery-backup Nonvolatile RAM (NV-RAM) 126 for storing a variety of settings, and so on.

An automatic document feeder (ADF) 13 is provided with a document tray. In the case of copying, scanning, or facsimile transmission, the ADF 13 feeds a document sheet placed on the document tray to a scan position by an image scanner 14. The image scanner 14 serves to optically read out image information recorded on the document sheet placed at the scan position. A printer controller 15 is operable to perform various control processing for printing. The printer controller 15 is provided with a Raster Image Processor (RIP) circuit 151 that serves to analyze Page Description Language (PDL) data sent from an external device and expand print target data on a bitmap memory. A printer engine 16 is operable to print a monochrome or color image on a single side or both sides of paper supplied from a multi-stage sheet deck 17. A finisher 18 is used to apply a finish of folding a printed sheet in two, or of stapling a printed sheet. A communication interface 19 connects the MFP 1 to the LAN 7 and the telephone line network 8, and thereby communication between the MFP 1 and external devices is made possible. The storage 20 is a mass storage device such as a hard disk drive (HDD). The storage 20 is provided with an area in which control data including the authorization information 240 is stored and folders (boxes) for storing various document files therein.

As discussed above, a first user and a second user merely perform login operation so that both the users are verified. Such simple operation enables an image forming apparatus to perform a process on user data to which one of the users is authorized to make access. The process is one designatable within operation permissions granted to at least one of the users.

In the foregoing embodiment, the case is discussed of permitting access to data of a user who first logs onto the MFP 1. Instead, however, another arrangement is possible in which, if a plurality of users log in the MFP 1, access to data of a user who logs in the MFP 1 last is permitted. Stated differently, the login order may be so set that a primary user, who intends to use the MFP 1, logs in first, and after that, an auxiliary user, who logs in the MFP 1 in order to expand an operation permission of the primary user, logs in the MFP 1. Alternatively, the login order may be so set that the auxiliary user first logs in the MFP 1, and after that, the primary user logs therein.

As to logout for a case where a plurality of users log in the MFP 1, the login of all the users may be canceled concurrently at a time when the logout button 56 is pressed. Alternatively, an appropriate screen may be displayed to enable selection of a user who is to log out.

In the embodiment discussed above, the configuration of the MFP 1, e.g., the contents of data in the access right table 241 and the operation permission tables 242 and 243, multiple login-related screen display, and so on may be altered as required in accordance with the subject matter of the present invention. The present invention is applicable not only to an MFP but to an image forming apparatus such as a printer and a facsimile machine.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus for performing a process on data stored in advance in accordance with operation by a verified user, the image forming apparatus comprising:
   a user authentication portion configured to perform user authentication on a second user in a state where a first user is verified and logs in the image forming apparatus;
   an access control portion configured to, in a login state where both the first user and the second user are verified, give a permission to perform a process on user data to which one of the first user and the second user determined based on a login order is granted access; and
   an operation control portion configured to, in the login state, accept operation that relates to the user data and falls within at least one of an operation permission given in advance to the first user and an operation permission given in advance to the second user.

2. The image forming apparatus according to claim 1, wherein said one of the first user and the second user determined based on the login order is the first user who has been verified in advance of the second user.

3. The image forming apparatus according to claim 1, wherein
   the user authentication portion performs further user authentication on one or more users in the login state, and
   the operation control portion accepts, in a login state where all of three or more users including the first user and the second user are verified, operation that falls within any of operation permissions given in advance to the three or more users.

4. The image forming apparatus according to claim 1, wherein
   the process on the user data includes options of printing, electronic mail transmission, and facsimile transmission, and
   the operation permissions given to the first user and the second user determine a selectable process among the options.

5. The image forming apparatus according to claim 1, wherein the operation permissions given to the first user and the second user indicate a settable range of a print quantity.

6. The image forming apparatus according to claim 1, wherein the operation permissions given to the first user and the second user indicate options of selectable print colors.

7. The image forming apparatus according to claim 1, wherein the operation permissions given to the first user and the second user determine whether or not data is to be scanned from a document sheet.

8. A non-transitory computer-readable storage medium storing thereon a computer program executed in an image forming apparatus for performing a process on data stored in advance in accordance with operation by a verified user, the computer program causing a computer included in the image forming apparatus to implement:
   user authentication processing for performing user authentication on a second user in a state where a first user is verified and logs in the image forming apparatus;
   access control processing for, in a login state where both the first user and the second user are verified, giving a permission to perform a process on user data to which one of the first user and the second user determined based on a login order is granted access; and operation control processing for, in the login state, accepting operation that relates to the user data and falls within at least one of an operation permission given in advance to the first user and an operation permission given in advance to the second user.

* * * * *